(12) United States Patent
Rucker

(10) Patent No.: US 9,798,640 B2
(45) Date of Patent: Oct. 24, 2017

(54) SYSTEMS AND METHODS FOR OFFLINE TESTING OF CUSTOMER PREMISE EQUIPMENT

(75) Inventor: Michael David Rucker, Fairburn, GA (US)

(73) Assignee: Cox Communications, Inc., Alanta, GA (US)

( * ) Notice: Subject to any disclaimer, the term of this patent is extended or adjusted under 35 U.S.C. 154(b) by 770 days.

(21) Appl. No.: 13/408,645

(22) Filed: Feb. 29, 2012

(65) Prior Publication Data

US 2012/0226462 A1 Sep. 6, 2012

Related U.S. Application Data

(60) Provisional application No. 61/448,042, filed on Mar. 1, 2011.

(51) Int. Cl.
*G06F 11/22* (2006.01)
(52) U.S. Cl.
CPC ............... *G06F 11/2294* (2013.01)
(58) Field of Classification Search
None
See application file for complete search history.

(56) References Cited

U.S. PATENT DOCUMENTS

| 7,664,317 | B1* | 2/2010 | Sowerby | G06T 7/0002 382/162 |
| 2008/0192119 | A1* | 8/2008 | Li | H04N 17/004 348/180 |
| 2012/0140641 | A1* | 6/2012 | Reese et al. | 370/245 |
| 2013/0002887 | A1* | 1/2013 | Bruce-Smith | 348/189 |
| 2013/0063606 | A1* | 3/2013 | McClay et al. | 348/181 |
| 2014/0218542 | A1* | 8/2014 | Blair et al. | 348/182 |

\* cited by examiner

*Primary Examiner* — An Do
*Assistant Examiner* — Renee I Wilson
(74) *Attorney, Agent, or Firm* — Eversheds Sutherland (US) LLP

(57) ABSTRACT

Systems and methods are described for testing customer premise equipment in an offline fashion. According to certain embodiments, a testing system including one or more computing devices can identify a test scenario that includes information associated with one or more commands and expected results associated with the commands. Such commands can be executed by customer premise equipment. One or more respective images associated with the execution of a command can be captured, and information associated with the command, the associated expected result, and one or more respective images can be displayed for evaluation by a user to determine whether the command is operating properly in the customer premise equipment that executed the command. Certain embodiments describe a confidence level which can correspond to a number of images to be captured in order to decrease the possibility that content was not captured for evaluation.

18 Claims, 6 Drawing Sheets

SYSTEMS AND METHODS FOR OFFLINE TESTING OF CUSTOMER PREMISE EQUIPMENT

RELATED APPLICATIONS

The present application is a non-provisional application claiming priority to U.S. Provisional Application No. 61/448,042, entitled "Video Engineering Offline Test Tool," filed on Mar. 1, 2011, which is hereby incorporated by reference in its entirety as if fully set forth herein.

TECHNICAL FIELD

Embodiments of this disclosure relate generally to testing the functionality of video equipment and, more particularly, to testing the functionality of customer premise equipment in an offline manner.

BACKGROUND

Service providers, such as cable or satellite providers, often rely upon various equipment to provide content to their customers. For example, various types and models of customer premise equipment, such as set-top boxes, can be used to display video content output by service providers. The equipment typically executes software that enhances the customer experience of viewing and/or interacting with the content. Testing the software and content to ensure proper functionality, however, can be problematic. Existing testing procedures implemented by service providers may require multiple persons to test perhaps hundreds of features and options executed by customer premise equipment by, for example, manually testing each command associated with a feature. Such activity can be time-consuming, error-prone, and costly. Furthermore, systems that attempt to automate such activity can be inaccurate, as even slight deviations in pixels between images may suggest a failure when the customer premise equipment may actually be operating properly.

BRIEF DESCRIPTION

Some or all of the above needs and/or problems may be addressed by certain embodiments of the disclosure. Certain embodiments may include systems and methods for offline testing of customer premise equipment. According to one embodiment, there is disclosed a method for: identifying, by a testing system comprising one or more computing devices, a test scenario comprising information associated with one or more commands and associated expected results, wherein the one or more commands are executable by a customer premise equipment; directing, by the testing system, communication of the one or more commands to the customer premise equipment; capturing, by the testing system, at least one respective image associated with the execution of each of the one or more commands by the customer premise equipment; and displaying, by the testing system, at least a portion of the information associated with at least one of the one or more commands along with the associated at least one respective image and expected result for evaluation by a user to determine whether the at least one command is operating properly in the customer premise equipment.

According to another embodiment, there is disclosed a system including a memory that stores computer-executable instructions and a processor. The processor is configured to execute the computer-executable instructions in the memory to: cause the identification of a test scenario comprising information associated with one or more commands and associated expected results, wherein the one or more commands are executable by a customer premise equipment; direct communication of the one or more commands to the customer premise equipment; cause the capture of at least one respective image associated with the execution of each of the one or more commands by the customer premise equipment; and cause the display of at least a portion of the information associated with at least one of the one or more commands along with the associated at least one respective image and expected result for evaluation by a user to determine whether the at least one command is operating properly in the customer premise equipment.

According to a further embodiment, there is disclosed a method for directing, by the testing system, communication of a command to a customer premise equipment for execution; determining, by the testing system, a number of images to capture after the command is executed; capturing, by the testing system, a first image before the command is executed by the customer premise equipment and a set of one or more second images after the command is executed by the customer premise equipment, the set of one or more second images comprising the determined number of images; displaying, by the testing system, information associated with the command, an expected result associated with the command, the first image, and the set of one or more second images for evaluation by a user; and receiving, by the testing system, input comprising an indication of whether the command is operating properly in the customer premise equipment.

Other embodiments, systems, methods, aspects, and features of the invention will become apparent to those skilled in the art from the following detailed description, the accompanying drawings, and the appended claims.

BRIEF DESCRIPTION OF THE FIGURES

The detailed description is set forth with reference to the accompanying drawings, which are not necessarily drawn to scale. The use of the same reference numbers in different figures indicates similar or identical items.

DETAILED DESCRIPTION OF THE INVENTION

Figure 1:
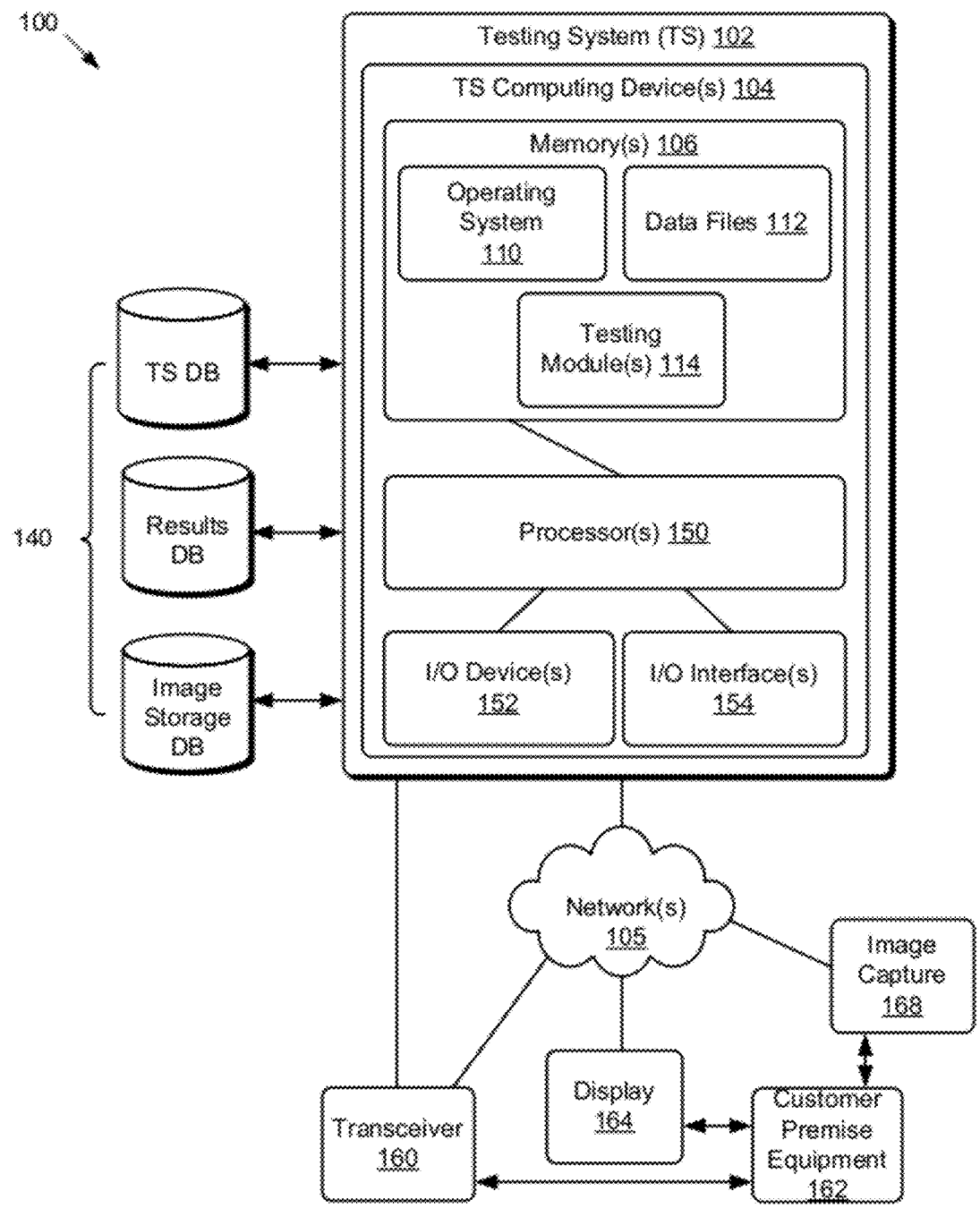
FIG. 1 depicts an example computing environment for implementing offline testing of customer premise equipment, according to an illustrative embodiment of the disclosure.

Illustrative embodiments will now be described more fully hereinafter with reference to the accompanying drawings, in which some, but not all embodiments of the disclosure are shown. The invention may be embodied in many different forms and should not be construed as limited to the embodiments set forth herein; rather, these embodiments are provided so that this disclosure will satisfy applicable legal requirements.

Illustrative embodiments of the disclosure are directed to, among other things, testing the functionality of software and video content for customer premise equipment, such as set-top boxes. Certain embodiments herein relate to enabling such testing in an offline environment. As used herein, "offline" can refer to the preparation and execution of test scenarios as well as the collection of associated test results for evaluation by a user at a later time.

Numerous test scenarios that test various features in customer premise equipment may be utilized as desired. Each test scenario can include information associated with commands that can be executed by customer premise equipment. Each command can have an expected result that describes successful operation of the command. The commands can be sent to the customer premise equipment for execution and, upon the customer premise equipment executing the commands, one or more respective images may be generated as a result. Images for a command can be captured and stored in association with the command that caused the images to be generated, information associated with the command, and the expected result associated with the command. At least a portion of the stored data utilized to generate a display can be presented such that a user can compare the expected result to the captured images to determine whether the command is operating properly in the customer premise equipment that executed the command.

As a specific example, features associated with the guide display in customer premise equipment can be tested. For instance, a "Launch guide" or similar command to display a guide menu in customer premise equipment can be tested in customer premise equipment. Expected result information, such as information describing a successful display of a guide menu, can describe successful execution of the "Launch guide" command. Before the "Launch guide" command is sent to the customer premise equipment for execution, a first image displayed by the customer premise equipment can be captured. Also, at least one other image can be captured after the "Launch guide" command has been executed by the customer premise equipment. Information associated with the "Launch guide" command (e.g., an instruction associated with outputting the command, etc.), expected result information, and the images captured before and after the execution of the "Launch guide" command can be stored in association with one another. A user may view the stored information and evaluate whether the "Launch guide" command is operating properly. For example, the user can compare the image captured before the execution of the "Launch guide" command with the one or more images captured after the execution of the "Launch guide" command in light of the expected result information. If the one or more images captured after the execution of the command properly display the menu guide, for example, a user may determine that the command is operating properly. As a next step in the process of testing the functionality of a guide display, a different command, such as "Press up arrow" or a similar command that causes a cursor to move upward on the guide, can be tested in similar fashion to the "Launch guide" command. The above commands are mere examples of commands that can be tested according to certain embodiments herein. Various other commands or features can be tested in other embodiments. Additionally, in certain embodiments, a plurality of commands may be tested in an offline manner and information associated with the testing can be stored. In this regard, a user may quickly review the information without manually providing associated commands.

FIG. 1 depicts an example computing environment 100 for implementing offline testing of customer premise equipment, according to an illustrative embodiment of the disclosure. The computing environment 100 can include a testing system ("TS") 102, at least one transceiver 160, customer premise equipment 162, at least one display 164, and/or at least one image capture device 168. Certain devices can communicate with other devices to enable offline testing of customer premise equipment 162 via any number of wired and/or wireless networks 105. In other embodiments, other networks, intranets, or combinations of networks may be used. Other embodiments may not involve a network and may, for example, provide features on a single device or on devices that are directly connected to one another, e.g., a transceiver 160 may be directly connected to one or more TS computing devices 104 and customer premise equipment 162. Other alternative networks, computing devices, and electronic device configurations are also possible.

As used herein, the term "device" can refer to any component that includes one or more suitable processors that can be configured to execute computer-readable, computer-implemented, or computer-executable instructions. Example devices can include customer premise equipment, personal computers, server computers, digital assistants, personal digital assistants, digital tablets, Internet appliances, application-specific circuits, microcontrollers, minicomputers, transceivers, or other processor-based devices. The execution of suitable computer-implemented instructions by one or more processors associated with various devices may form special purpose computers or other particular machines that facilitate offline testing of customer premise equipment. For example, the execution of computer-implemented instructions by one or more processors 150 associated with the TS computing devices 104 may form a special purpose computer or particular machine that facilitates offline testing of customer premise equipment.

As used herein, the term "command" can refer to an instruction that can be interpreted by customer premise equipment to perform an action corresponding to the command, e.g., launch a guide display, launch parental control, select video content, move arrows along the guide, and various other functions or features that may be implemented in customer premise equipment. As desired, each command may be associated with textual information that describes the command. Additionally, each command can have an expected result, which can be a text description of a successful implementation of the command. A user of the test system 102, for example, can compare an expected result with one or more captured images to determine whether the command is working or operating properly. In this way, a command and/or information associated with the command can be associated with an expected result and one or more images resulting from executing the command in customer premise equipment. A command may also be referred to herein more generally as a "message" that is communicated between devices used to implement offline testing of customer premise equipment.

As used herein, the term "customer premise equipment" can refer to any device and associated equipment located at a customer or subscriber's location and connected with a service provider or carrier's content distribution channels at a demarcation point. One example of customer premise equipment includes set-top boxes, such as standalone set-top boxes and/or embedded set-top boxes. A set-top box can be referred to as an information appliance device that generally contains a tuner and connects to a television set (or other display device) and an external source of a signal. The set-top box can convert the signal into content which is then displayed on the television screen or other display device. Set-top boxes used by service providers of content, such as cable or satellite television providers, may be leased by the service providers or purchased by customers. Various other types of set-top boxes and customer premise equipment may exist in other embodiments.

The test system 102 can include one or more computing devices 104, each of which may include one or more processors 150 configured to communicate with one or more memory devices 106, input/output ("I/O") interfaces 152, and/or communication interfaces 154. The one or more computing devices 104 may communicate with one another to enable offline testing of customer premise equipment. Although a single test system is shown, the operations and/or control of the test system 102 may be distributed among any number of other devices, systems, computers, and/or processing components in addition to those that may be present in the test system 102. The memory devices 106 can include any number of suitable memory devices, such as caches, read-only memory devices, random access memory devices, magnetic storage devices, etc. The memory devices 106 can store data, executable instructions, and/or various program modules utilized by the processor 150. The various program modules are discussed in greater detail in the following sections.

The one or more I/O interfaces 152 can enable communication between one or more I/O devices including, but not limited to, one or more user interface devices such as a display, keypad, mouse, pointing device, control panel, touch screen display, remote control, microphone, speaker, etc., that can facilitate user interaction with the TS computing devices 104. The communication interfaces 154 can facilitate a connection between the computing device(s) 104 and the one or more networks 105, as well as directly to other devices in the computing environment 100.

As noted above, certain embodiments herein relate to testing customer premise equipment 162, such as set-top boxes. Although only one customer premise equipment device 162 is shown, many more devices may exist in other embodiments. The customer premise equipment 162 can communicate with a display 164, such as a television or monitor, such that content output from the customer premise equipment 162 is displayed on display 164. An image capture device 168, such as a camera or computing device with screen capture capabilities, can capture images from the display 164. In one embodiment, the image capture device 168 may receive an instruction from another device to perform the capture. The image capture device 168 or another component can direct storage of the captured images in a memory accessible by one or more other devices.

A communications device, such as the transceiver 160, can enable communications between the one or more computing devices 104 and the customer premise equipment 162. In one embodiment, such communications can occur in part via infrared signals. For example, a transceiver 160 can receive messages, e.g., commands or information that facilitates the generation of commands, from the one or more computing devices 104 and send the commands to customer premise equipment 162 via an infrared emitter embedded in the transceiver 160. The communication of commands to customer premise equipment 162 can occur via wireless or wired connections as desired in various embodiments. In one implementation, the transceiver 160 may transmit commands to multiple customer premise equipment devices. For example, the transceiver 160 can simultaneously send the same command to multiple ones of the customer premise equipment 162 for execution. In some embodiments, the transceiver 160 may include software that works in conjunction with the emitter to receive and send commands to customer premise equipment. For example, certain off-the-shelf products that may be equipped with an infrared emitter and accompanying software to enable communication with other devices can be used in some embodiments. As shown in FIG. 1, the transceiver 160 may be connected to other devices via network 105, such as an intranet or the Internet. Although only one transceiver 160 is shown in FIG. 1, more transceivers may exist in other embodiments. Also, various communication technologies other than infrared can enable communication between the test system 102 and customer premise equipment 162 in other embodiments.

Returning to the contents of the memory devices 106 of the computing devices 104, the memory devices 106 can include an operating system 110, data files 112, one or more testing modules 114, and/or one or more databases 140. The data files 112 and/or the databases 140 may include any suitable data that facilitates the offline testing of customer premise equipment. Such data can include, but is not limited to, information related to various test scenarios including functions or features that can be performed by customer premise equipment and thus may be desirable for testing information associated with the delivery of commands to customer premise equipment, images captured in association with the execution of commands in customer premise equipment (e.g., in the image storage database), and/or evaluation results based on a user's determination of whether a command is operating properly in customer premise equipment (e.g., in the results database) and/or based upon automated evaluation of command execution. Additionally, the databases 140 may include internal and/or external databases.

In certain embodiments, data such as the information associated with commands, expected results, references to captured images, and/or captured images may be stored in association with one another, e.g., each line of a data structure can include a command, information associated with the command, associated expected results, and/or associated references to one or more captured images. The one or more databases 140 or data files 112 can store a wide variety of other information that facilitates the offline testing of customer premise equipment. In one embodiment, the one or more databases 140 can store information associated with one or more test scenarios to be executed by customer premise equipment during offline testing. For example, each test scenario can include a sequence of unique commands associated with a particular testing procedure.

Figure 2:
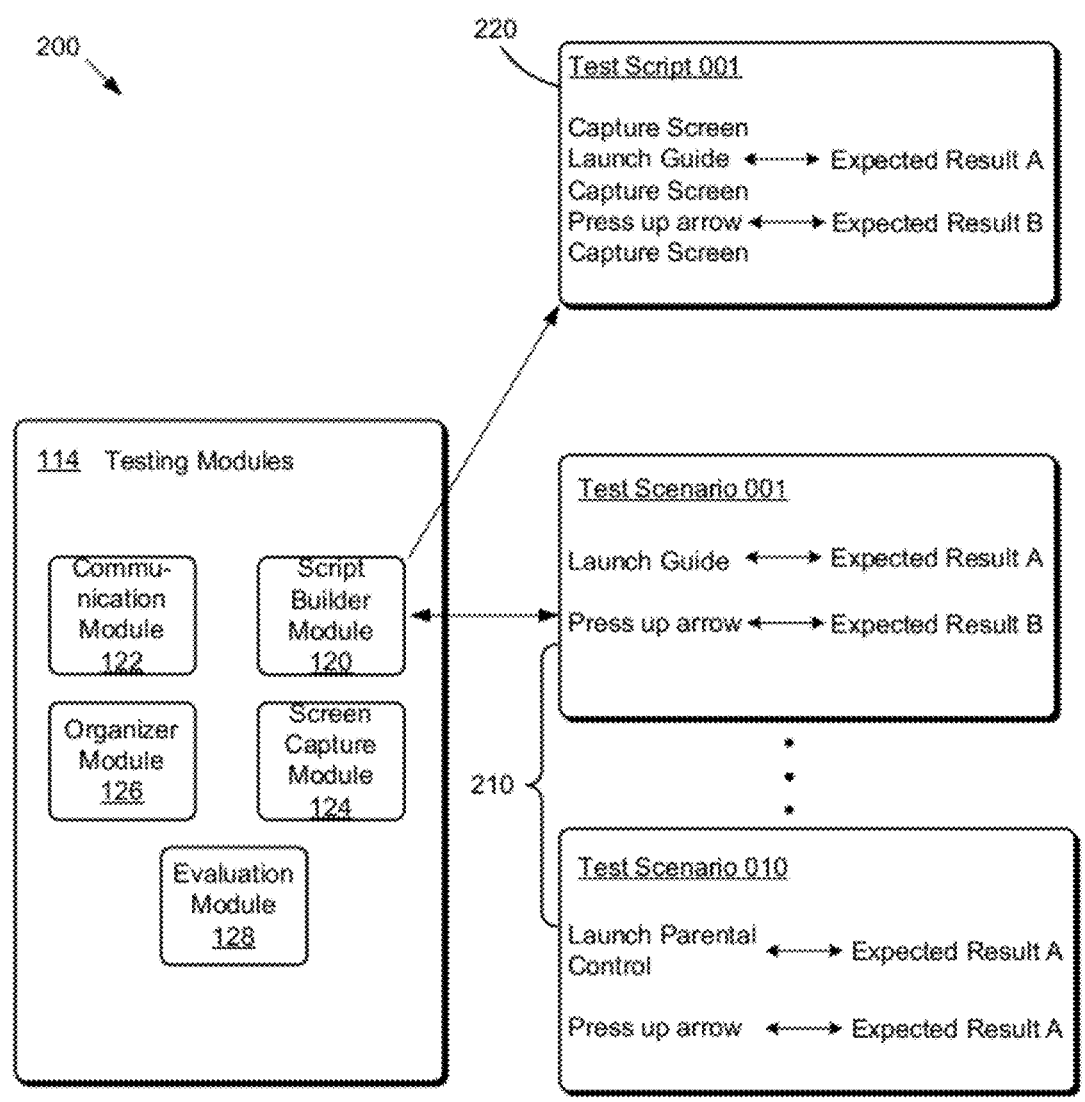
FIG. 2 depicts example software modules for implementing offline testing of customer premise equipment, according to an illustrative embodiment of the disclosure.

The testing modules 114 may include any number of suitable software modules and/or applications that control the offline testing of customer premise equipment. As shown in FIG. 2, such modules can include a script builder module 120, a communication module 122, a screen capture module 124, an organizer module 126, and an evaluation module 128.

The script builder module 120 can prepare a script that can be executed in conjunction with a testing scenario. Such a script can control the processes of the offline testing of customer premise equipment 162. In one embodiment, the script builder module 120 can include a parser or a sub-module that parses commands, information associated with the commands, and expected results associated with each command from a test scenario file. Such commands can be stored in test scenarios 001 and 010 shown in FIG. 2. For example, test scenario 001 can include information associated with the commands "Launch guide" (or a similar command to display the control menu of the customer premise equipment) and "Press up arrow" (or a similar command to move the cursor or highlighted section of the guide one level higher). A test scenario can also include an expected result associated with each command, such as "Guide displays, selected video is shown" as illustrated in association with the "Launch Guide" command. In some embodiments, test scenarios can include additional information such that the parser may be required to identify the particular commands and expected results among the additional information. The parsed information can serve as inputs into a script prepared by the script builder module 120. The script builder module 120 can add additional commands that can cause other actions to be performed upon executing the test script. For example, before and after each command is executed, a "capture screen" or similar command can be executed to capture one or more images associated with executing the command. Script 220 depicts a test script 001 that includes commands parsed from test scenario 001 along with the additional requests to capture images associated with executing the commands. Although only two test scenarios are shown in FIG. 2, fewer or more may exist in other embodiments.

Returning to FIG. 2, the communication module 122 can output the commands or information utilized to generate the commands for communication to the customer premise equipment 162. In one embodiment, the communication module 122 can send the commands to a device that is in communication with the customer premise equipment 162, e.g., the transceiver 160. The transceiver 160 can send the commands simultaneously to multiple customer premise equipment to enable more efficient testing of the commands, according to one embodiment. The communication module 122 can also send requests to capture images generated as a result of executing the commands to an image capture device, e.g., image capture device 168. Information associated with commands, expected results, and/or captured images can be output as a result of executing a script, such as the script 220 in one embodiment, or they may be output irrespective of a script in other embodiments.

The screen capture module 124 can instruct a screen capture device, e.g., image capture device 168, or a similar device that is configured to execute computer-executable instructions, to capture an image. The screen capture device 168 can be connected to a display device, such as a television. The television can be connected to customer premise equipment such that the output from the customer premise equipment, e.g., images that result from executing commands in the customer premise equipment, can be displayed on the television. The screen capture module 124 can cause the image on the television to be captured as displayed on the television. In another embodiment, the display device can be a monitor that is connected to a computing device of the one or more computing devices 104. According to this embodiment, the screen capture module 124 can drive the operation of customer premise equipment 162 and capture generated images by, for example, executing a Ctrl-Print-Screen or similar command recognized by certain operating systems 110 to capture a screen snapshot. The screen capture module 124 can store the captured images in a memory (e.g., memory 106) or a database (e.g., one or more of the databases 140), as examples. In other embodiments, various other software and/or systems can drive the operation of customer premise equipment 162 and capture generated images from a monitor connected to a computing device executing the software and/or from another display showing the generated images. As noted above, a script 220 can include a command to capture the screen. Upon execution of the script, the "capture image" command can invoke an instance of the screen capture module 124 to implement the actual capture of images on the screen.

An organizer module 126 can be used to assemble and store information related to the offline testing of customer premise equipment. For example, the organizer module 126 can store a command, instructions and/or other information associated with the command, an expected result associated with the command, and a reference to one or more images associated with the command. In this way, each command and its associated information can constitute a record in a database (e.g., one or more of databases 140) or a file (e.g., data files 112). An evaluation module 128 can access the record and render the associated information in a graphical user interface ("GUI") for evaluation by a user. For example, the evaluation module 128 can display information associated with the command, the expected result, and a link that references the one or more images that were captured in association with the execution of the command. Alternatively, the images rather than the links can be displayed. In one embodiment, the one or more images associated with the link can be displayed upon a user clicking on the reference link. The evaluation module 128 can also display, via the GUI, options that enable a user to indicate whether the command was properly executed in customer premise equipment. For example, a user may select a radio button to indicate that a command "passed," "failed," or cannot be evaluated at the present time of evaluation, e.g., "TBD." As noted above, a user can make such determinations by comparing the images to the expected result. In some embodiments, a user may additionally or alternatively apply general knowledge based on the user's own expectations or experiences to determine whether the command is operating properly in customer premise equipment.

The evaluation module 128 can also receive information regarding a desired confidence level for performing the offline testing of customer premise equipment 162. The confidence level may indicate a degree of confidence that content was captured. For example, certain content may be lost between the execution of a command by customer premise equipment 162 and the capture of images that may result from executing the command. Such a result can occur based on a default confidence level of about 80%, in one embodiment. Only one image may be captured for a confidence level of 80%, according to this embodiment. The image may be captured at a particular elapsed time, e.g., two seconds, after the execution of the command by the customer premise equipment. In one embodiment, a user may specify a greater confidence level, e.g., 95%, to receive a greater assurance that content is not missed. Such a confidence level can correspond to the capture of four images occurring ½ second apart, beginning after the execution of the command by the customer premise equipment 162. As the confidence level increases, the number of captured images may also increase while the elapsed time between the captured images may decrease to reduce the chance that content is missed. In some embodiments, a video may capture content after a command is executed to provide an even greater confidence level. As the confidence level decreases, the number of captured images may also decrease while the elapsed time between the captured images may increase to reflect a reduced desire to capture content that may be missed. The elapsed time and number of images mentioned above are merely examples to illustrate the functionality of the confidence level. Different numbers of images and associated elapsed times between captures may exist in other embodiments. Also, the confidence level may correlate to measurements other than elapsed time between captured images. In certain embodiments, a confidence level may be set for each command or function to be tested in customer premise equipment 162 such that features that may be more critical or representative of whether customer premise equipment 162 is working properly may receive a higher confidence level.

Thus, certain embodiments herein facilitate the automated collection of test results by outputting commands for execution by customer premise equipment 162 and capturing images associated with the execution of the commands. These embodiments also facilitate manual evaluation of test results by a user. Such manual review can enable user discretion in determining whether potential subtle variations in image output necessitate a rejection or otherwise represent successful operation of the commands in the customer premise equipment.

Those of ordinary skill in the art will appreciate that the computing environment 100 shown in and described with respect to FIGS. 1 and 2 is provided by way of example only. Numerous other operating environments, system architectures, and device configurations are possible. Other system embodiments can include fewer or greater numbers of components and may incorporate some or all of the functionality described with respect to the system components shown in FIGS. 1 and 2.

Figure 3:
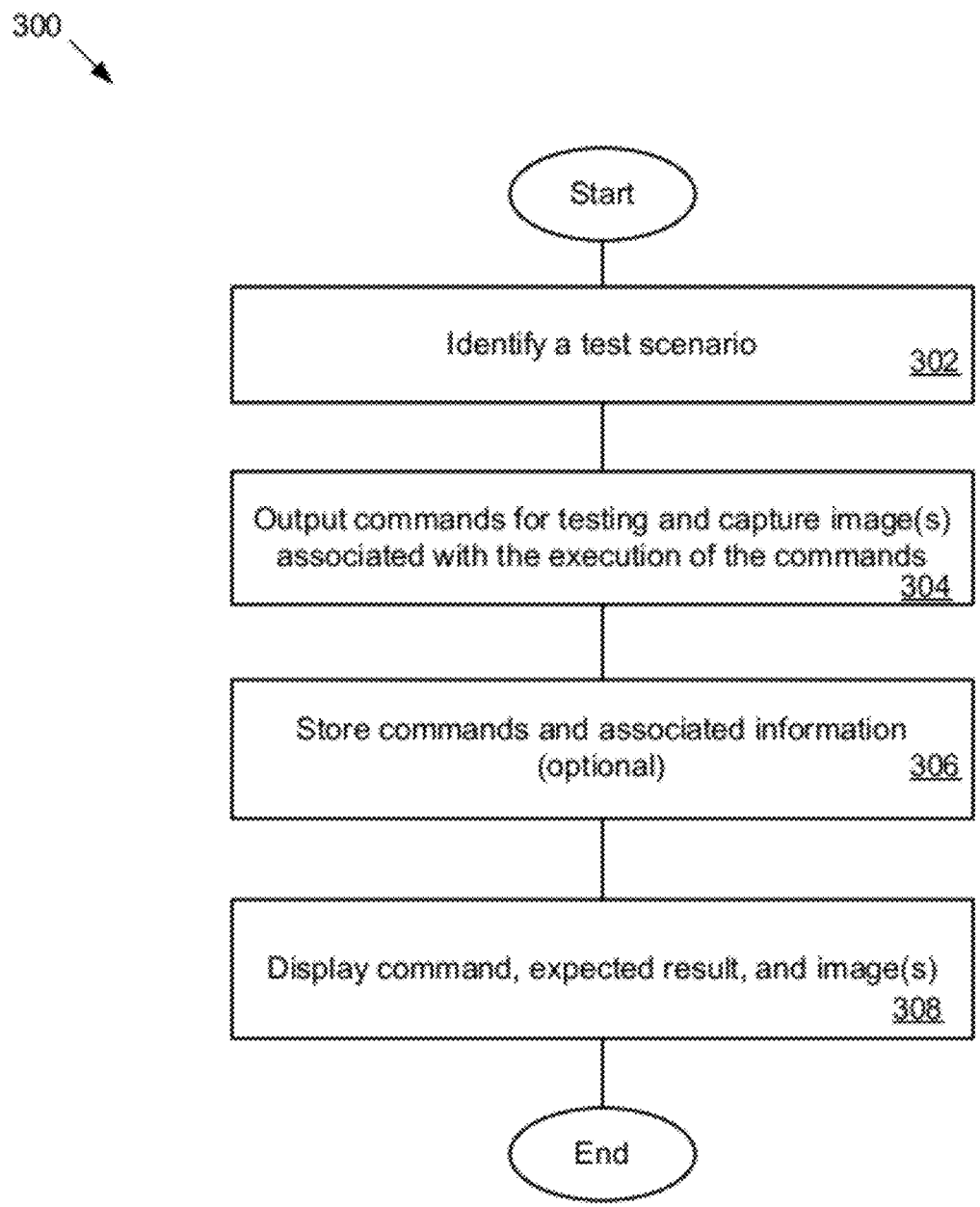
FIG. 3 depicts a flow diagram of an example method for performing offline testing of customer premise equipment, according to an illustrative embodiment of the disclosure.

FIG. 3 depicts a flow diagram of an example method 300 for performing offline testing of customer premise equipment, according to an illustrative embodiment of the disclosure. The method 300 can begin at block 302, where a test scenario can be identified. In one embodiment, software, e.g., the script builder module 120 illustrated in FIG. 2, can iteratively select each of the available test scenarios, preparing a different test upon each selection such that all available test scenarios, or a user-specified selection of test scenarios according to some embodiments, can be implemented in customer premise equipment.

At block 304, the commands in the identified test scenario can be output for communication to customer premise equipment 162 and images associated with the execution of the commands can be captured. In one embodiment, information associated with the commands can be output to a communications unit, such as transceiver 160, that is capable of communicating with one or more customer premise equipment devices. Outputting the commands in this fashion can enable the simultaneous execution and hence testing of multiple customer premise equipment devices. Details regarding the capture of images will be discussed in greater detail in association with FIG. 5.

At block 306, information associated with the commands tested in the customer premise equipment, the associated expected results, and one or more captured images associated with the execution of the commands can be stored. For example, such information can be stored in one or more of the databases 140. The information can also be stored in one or more files, such as data files 112. Each set of command information, associated expected result, and associated one or more images can constitute a record in the database or file. As examples, the data file can be an extensible markup language (XML) file or hypertext markup language (HTML) file that includes a reference or hyperlink to the one or more images associated with the command. Utilizing the link, the one or more images, which can be stored in the one or more databases 140, can be accessed and displayed. Example data files in other embodiments may include, but are not limited to, image files, bitmap files, or comma-separated value files.

Figure 4:
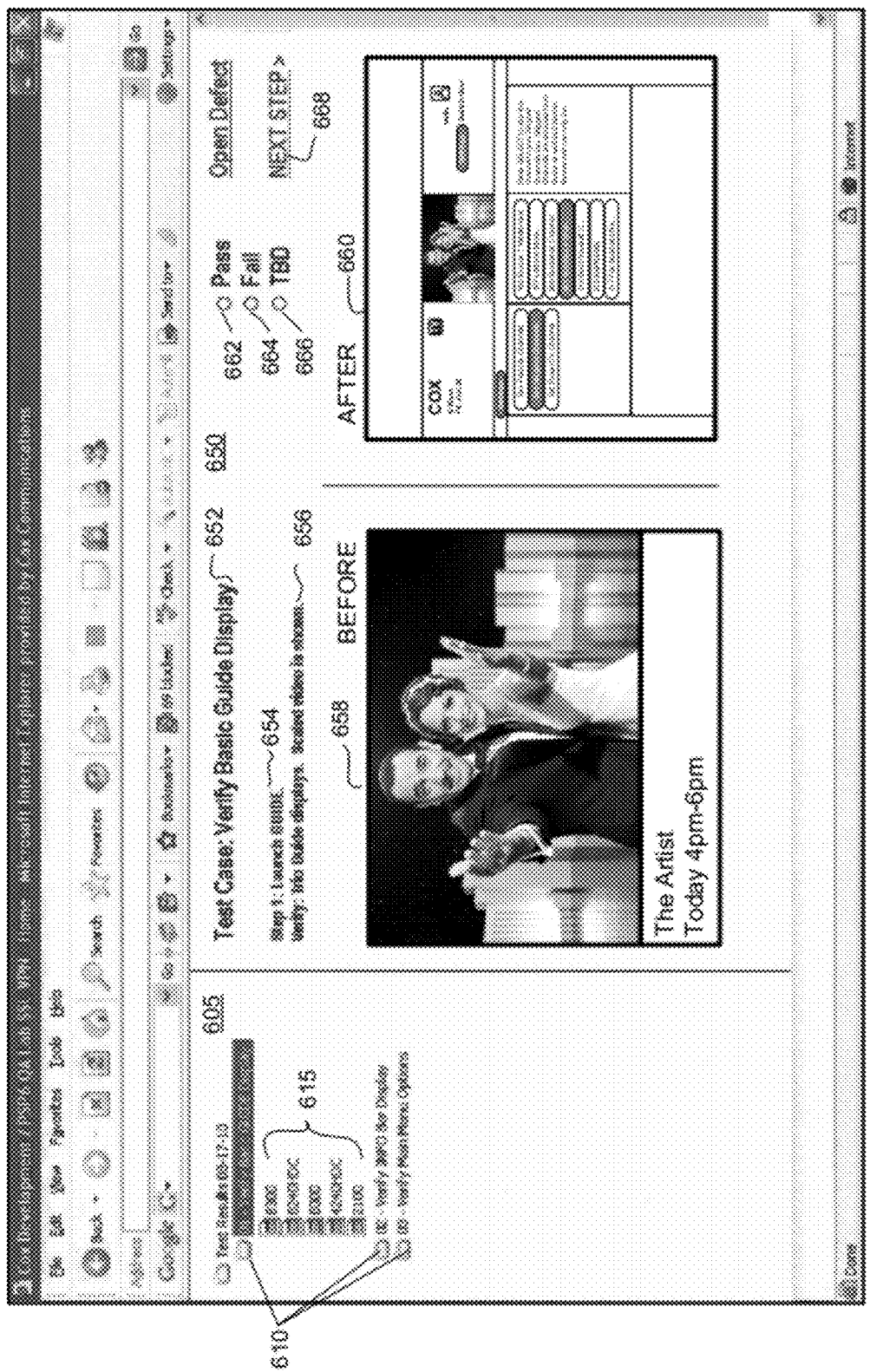
FIG. 4 is an example graphical user interface (GUI) that enables a user to evaluate whether a command is operating properly in customer premise equipment.

At block 308, information associated with each of the commands, their expected results, and associated one of more images can be displayed. In one embodiment, such information can be displayed by the evaluation module 128. FIG. 4 depicts an example display window illustrating a control panel 605 and a display panel 650. The control panel 605 can include folders that correspond to various features 610 in customer premise equipment 162, such as "Verify Basic Guide Display," "Verify Info Bar Display," and "Verify main Menu Options." The features folders can include files 615 for various types of customer premise equipment that performed a test of the features by executing commands corresponding to the features. Upon a user selecting a particular customer premise equipment among files 615, panel 650 can display the name of the test case 652, information associated with the command 654 that was executed by the customer premise equipment (e.g., a text description of the command), and an expected result 656. For example, a successful implementation of the "Launch guide" command can be associated with the expected result "Guide displays, scaled video is shown." The expected result can assist a user in determining whether the "Launch guide" command was executed properly. The panel 650 can also include a "before" image 658 and at least one "after" image 660. A "before" image 658 can be captured before the execution of a command while the "after" image(s) 660 can be captured after the execution of the command. The panel 650 may further include selection indicators, e.g., radio buttons 662 ("Pass"), 664 ("Fail"), and 666, "TBD." Such indicators can receive input indicating whether a command was executed properly by customer premise equipment. As a specific example, the "Launch guide" command 654 can be executed by customer premise equipment 162, as shown in control panel 605. As a result of executing the "Launch guide" command, the customer premise equipment can generate an "after" image 660. Before executing the command, according to one embodiment, an image can be captured, e.g., "before" image 658. A user can compare the expected result 656 ("Trio Guide displays, scaled video is shown") to the "before" image 658 and "after" image 660 to determine whether the Guide does indeed display along with scaled video. Because the after image 660 illustrates the Guide display along with a scaled version of the previously displayed "before" image 658, a user can indicate that the "Launch Guide" command was successfully performed by selecting radio button 662 for "Pass" at block 308 in FIG. 3. In some embodiments, a user may be unable to determine whether a command was executed properly by customer premise equipment and may select radio button 666 ("TBD") as a result. After one command has been evaluated, a user may select link 668 ("Next Step") to evaluate another command in similar fashion to that performed for the "Launch guide" command.

Figure 5:
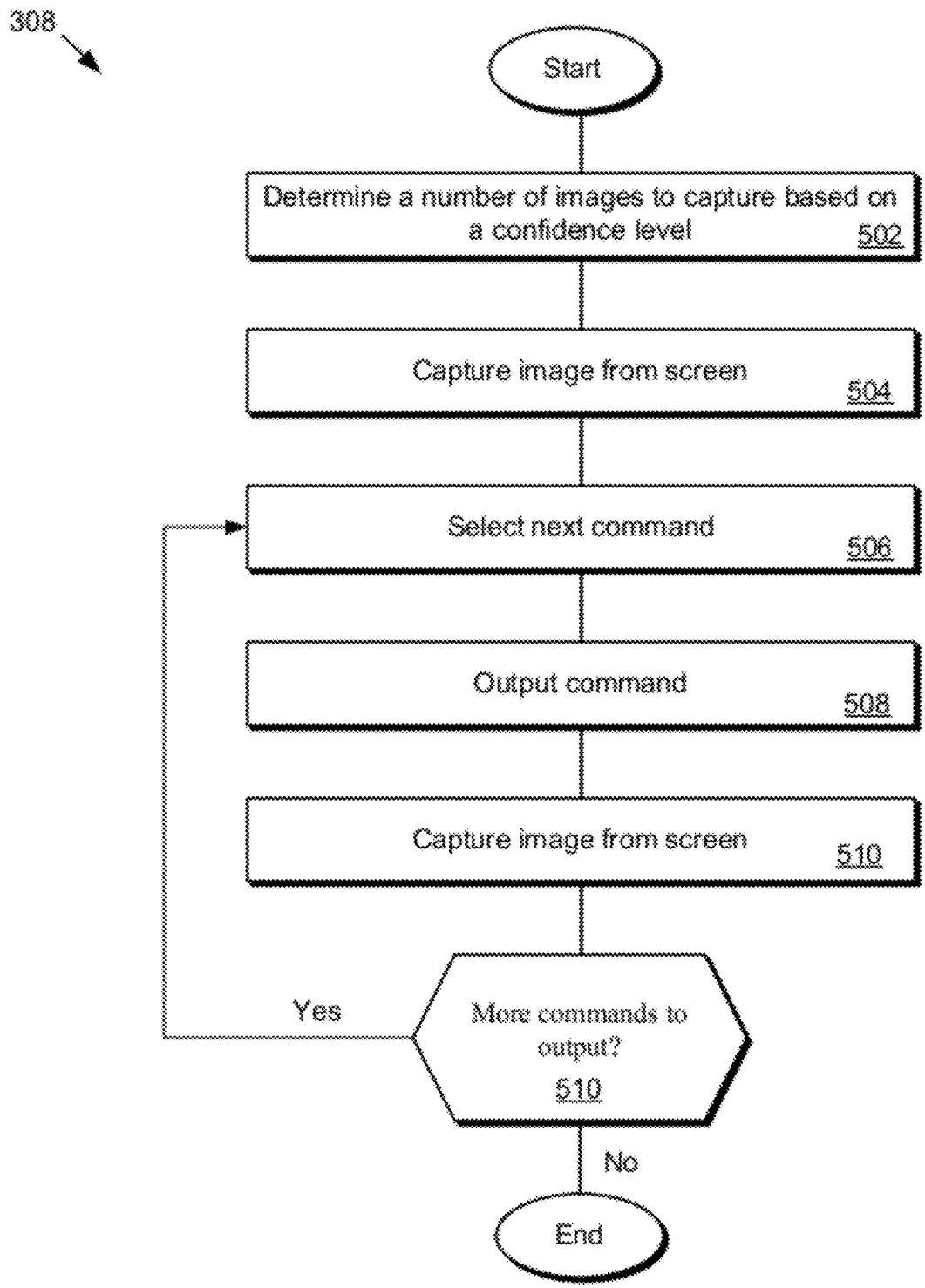
FIG. 5 is a flow diagram of an example method for outputting commands to customer premise equipment and capturing images associated with the execution of the commands, according to an illustrative embodiment of the disclosure.
Figure 6:
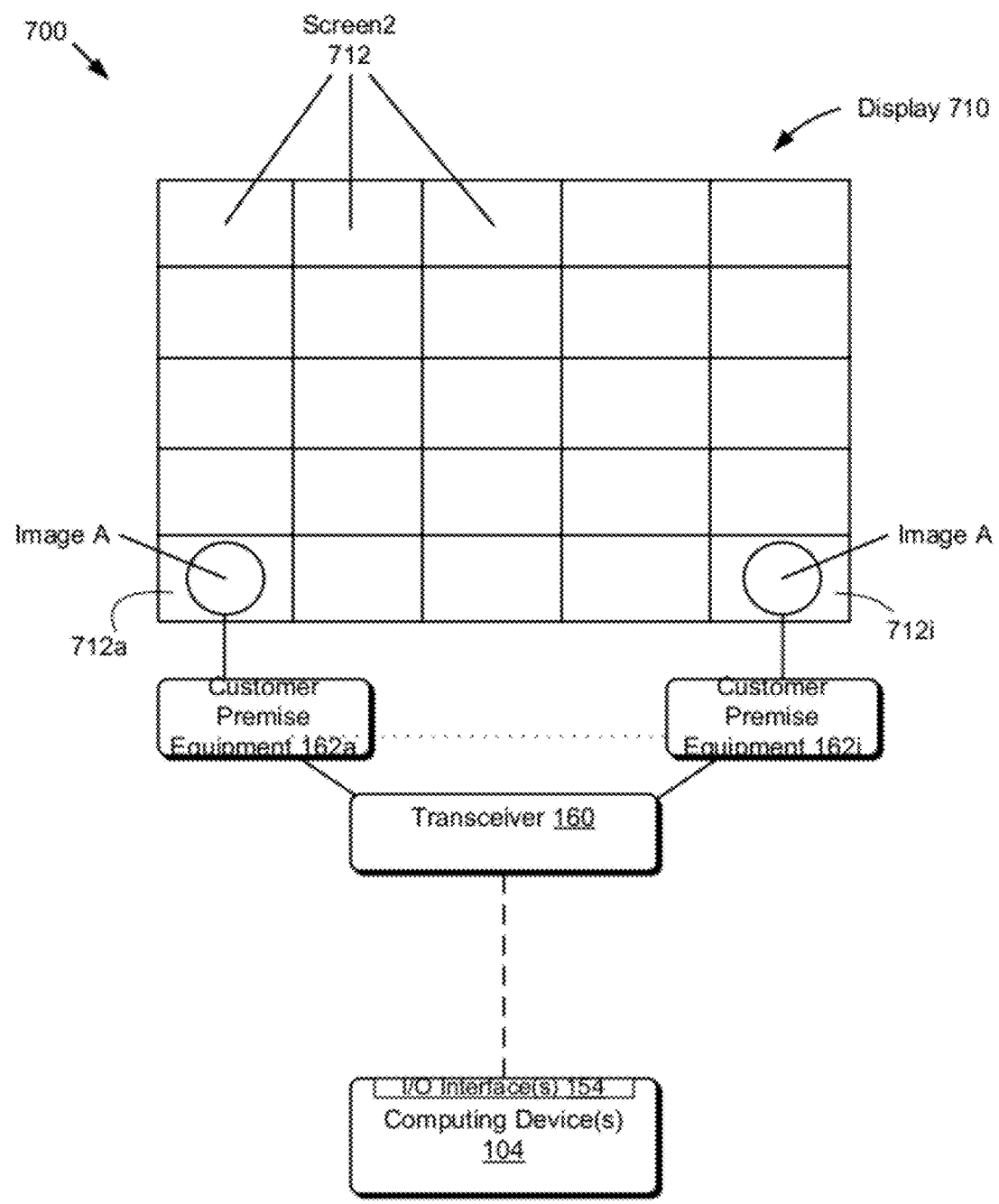
FIG. 6 is an example testing environment including a transceiver configured to communicate with multiple customer premise equipment devices to enable simultaneous testing of the devices, according to an illustrative embodiment of the disclosure.

FIG. 5 will now be described in conjunction with FIG. 6 to illustrate the details of a method for outputting commands to customer premise equipment and capturing images associated with executing the commands, as shown at block 304 in FIG. 3. Processing can begin at block 502, where a number of images to capture based on a confidence level can be determined. As noted above, a user can specify a confidence level which can in turn determine a number of images to capture and an elapsed time or delay between each capture. For example, the number of images to capture can be correlated with the confidence level. For example, an 80% confidence level can correspond to a request to capture one image while a 95% confidence level can correspond to a request to capture four images.

At block 504, a first image can be captured. Such an image can be captured before a command is executed by customer premise equipment, e.g., "before" image 658 in FIG. 4. A command can be output at block 508 after it is selected at block 506, according to one embodiment. In one embodiment, the command (or information associated with the command) can be output by the communication module 122. Outputting a command can refer generally to sending a command (or information utilized to generate a command) to a device that is configured to communicate with customer premise equipment, such as transceiver 160 shown in FIG. 1. The transceiver 160 is also illustrated in FIG. 6 as capable of receiving a message, e.g., a command, from the one or more computing devices 104 and sending the message to multiple customer premise equipment devices 162a-162i such that the command can be executed simultaneously or about the same time by the customer premise equipment 162a-162i.

One or more images that may result from the execution of the command can be captured at block 510. The capture can be performed in part by the capture module 124 in association with one or more image capture devices 168, in one embodiment. For example, Image A can be captured in screen 712a of the display 710 in FIG. 6. The same Image A can also be captured in screen 712i of the display 710. Each of the screens 712 can display an image in conjunction with operation of a customer premise equipment device. For example, each of the twenty-five rectangles in the display 710 can be associated with one customer premise equipment devices 162. Although only twenty-five screens 712 are shown corresponding to twenty-five customer premise equipment devices 162, fewer or more screens 712 and devices 162 may exist in other embodiments. Also, while a circle is shown as Image A, Image A may be content such as video in actual embodiments. If it is determined at decision block 510 that more commands are available for output to customer premise equipment, for example as part of a test scenario, processing can return to block 506 where a next command can be selected.

The operations described and shown in the example methods 300 and 500 of FIGS. 3 and 5 may be carried out or performed in any suitable order as desired in various embodiments of the invention. Additionally, in certain embodiments, at least a portion of the operations may be carried out in parallel. Furthermore, in certain embodiments, less than or more than the operations described in FIGS. 3 and 5 may be performed.

Various block and/or flow diagrams of systems, methods, apparatus, and/or computer program products according to example embodiments of the disclosure are described above. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

The computer-executable program instructions may be loaded onto a special purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special purpose, hardware-based computer systems that perform the specified functions, elements or steps, or combinations of special purpose hardware and computer instructions.

Many modifications and other embodiments of the invention set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:
1. A method comprising:
receiving, by a testing system comprising one or more computing devices, a selection of a test scenario by a user, the test scenario comprising information associated with one or more commands, associated expected results, and a confidence level associated with the one or more commands;

identifying, by the testing system, the one or more commands and the associated expected results, wherein the one or more commands are executable by a customer premise equipment;

directing, by the testing system, communication of the one or more commands to the customer premise equipment;

determining, by the testing system and based at least in part on the confidence level, a number of images to capture and an elapsed time between a beginning of the execution of the one or more commands and a time associated with capturing an image;

capturing, by the testing system and based at least in part on the number of images to capture and the elapsed time, at least one respective image associated with the execution of each of the one or more commands by the customer premise equipment, wherein the confidence level is based at indicates an elapsed time between a beginning of the execution of the one or more commands and a time associated with capturing the at least one respective image; and outputting, by the testing system, at least a portion of the information associated with at least one of the one or more commands, the associated at least one respective image, and the associated expected result on a display for evaluation by the user to determine whether the at least one command is operating properly in the customer premise equipment.

2. The method of claim 1 wherein the customer premise equipment comprises a first customer premise equipment, the at least one respective image associated with each of the one or more commands comprises a first at least one respective image, and the display comprises a first display, the method further comprising:

directing, by the testing system, communication of the one or more commands to a second customer premise equipment; and capturing, by the testing system, a second at least one respective image associated with the execution of each of the one or more commands by the second customer premise equipment, wherein outputting at least a portion of the information associated with at least one of the one or more commands comprises outputting at least a portion of the information, the first at least one respective image, and the second at least one respective image on a second display for evaluation by the user to determine whether at least one command is operating properly in the customer premise equipment.

3. The method of claim 1 wherein the at least one respective image comprises one of a plurality of images or a video.

4. The method of claim 1 wherein the displayed at least one respective image comprises a first image captured before the at least one command is executed and a second image captured after the at least one command is executed.

5. The method of claim 1 wherein directing the communication comprises sending one of (i) the one or more commands or (ii) instructions that facilitate generation of the one or more commands to a device in communication with the customer premise equipment.

6. The method of claim 1 further comprising storing, by the testing system, the at least a portion of the information associated with the at least one command, the associated expected result, and a reference to the associated at least one image, wherein the displaying comprises accessing a file to render a display.

7. The method of claim 1 further comprising receiving, by the testing system, input associated with the evaluation, wherein the input comprises an indication of whether execution of the at least one command achieved the expected result.

8. The method of claim 1 wherein the at least one respective image is captured via at least one of an image capture device or a screen snapshot.

9. The method of claim 1 further comprising comparing, by the testing system, the expected result associated with a command of the one or more commands to the at least one respective image for the command to determine whether the command is operating properly in the customer premise equipment.

10. The method of claim 1 wherein identifying the test scenario comprises selecting the test scenario from a plurality of test scenarios.

11. The method of claim 1 further comprising:

generating, by the testing system based at least in part upon the information, a script associated with the one or more commands; and executing, by the testing system, the script to facilitate the directing and the capturing.

12. A system comprising:

at least one memory that stores computer-executable instructions; and at least one processor configured to access the at least one memory, wherein the at least one processor is configured to execute the computer-executable instructions to:

receive a selection of a test scenario by a user, the test scenario comprising information associated with one or more commands, associated expected results, and a confidence level associated with the one or more commands;

identify one or more commands and the associated expected results, wherein the one or more commands are executable by a customer premise equipment;

direct communication of the one or more commands to the customer premise equipment;

determine, based on the confidence level, a number of images to capture and an elapsed time between a beginning of the execution of the one or more commands and a time associated with capturing an image;

capture, based at least in part on the number of images to capture and the elapsed time, at least one respective image associated with the execution of each of the one or more commands by the customer premise equipment, wherein the confidence level indicates an elapsed time between a beginning of the execution of the one or more commands and the capture of the at least one respective image; and cause outputting of at least a portion of the information associated with at least one of the one or more commands, the associated at least one respective image, and expected results to be output on a display for evaluation by the user to determine whether the at least one command is operating properly in the customer premise equipment.

13. The system of claim 12 wherein the customer premise equipment comprises a first customer premise equipment, the at least one respective image associated with each of the one or more commands comprises a first at least one respective image, and the display comprises a first display, and wherein the at least one processor is further configured to execute the computer-executable instructions to:

direct communication of the one or more commands to a second customer premise equipment;

cause the capture of a second at least one respective image associated with the execution of each of the one or more commands by the second customer premise equipment; and cause at least a portion of the information associated with at least one of the one or more commands, the first at least one respective image, and the second at least one respective image to be output on a second display for evaluation by the user to determine whether at least one command is operating properly in the customer premise equipment.

14. The system of claim 13 further comprising a communication device, wherein the communication device receives the one or more commands and sends the one or more commands to the first customer premise equipment and the second customer premise equipment.

15. The system of claim 12 wherein the at least one processor is further configured to execute the computer-executable instructions to cause receipt of input associated with the evaluation, the input comprising an indication of whether execution of the at least one command achieved the expected result.

16. The system of claim 12 wherein the displayed at least one respective image comprises a first image captured before the at least one command is executed and a second image captured after the at least one command is executed.

17. A method comprising:
receiving, by a testing system comprising one or more computing devices, a selection of a test scenario by a user, the test scenario comprising information associated with a command, an associated expected result, and a confidence level associated with the command;

directing, by the testing system, communication of the command to a customer premise equipment for execution;

determining, by the testing system and based at least in part on the confidence level, a number of images to capture and an elapsed time between a beginning of the execution of the command and a time associated with capturing an image;

capturing, by the testing system and based at least in part on the number of images to capture and the elapsed time, a first image before the command is executed by the customer premise equipment and a set of one or more second images after the command is executed by the customer premise equipment, the set of one or more second images comprising the determined number of images, the captured first image and the set of one or more second images corresponding to a confidence level, wherein the confidence level indicates an elapsed time between a beginning of the execution of the command and the capture of the at least one respective image;

outputting, by the testing system, information associated with the command, an expected result associated with the command, the first image, and the set of one or more second images on a display for evaluation by the user; and receiving, by the testing system, input comprising an indication of whether the command is operating properly in the customer premise equipment.

18. The method of claim 17 further comprising storing, by the testing system:
the information associated with the command;
a first link corresponding to the first image; and
one or more second links corresponding to a respective image of the set of one or more second images.

* * * * *